(12) United States Patent
Kull et al.

(10) Patent No.: US 7,083,230 B2
(45) Date of Patent: *Aug. 1, 2006

(54) HYBRID COMPOSITE-METAL ENERGY ABSORBING SEAT

(75) Inventors: Matthew H. Kull, Parker, CO (US); Dennis D. Olcott, Lone Tree, CO (US); Sharon M. Wilson, Colorado Springs, CO (US)

(73) Assignee: Adam Aircraft Industries, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/072,904

(22) Filed: Mar. 3, 2005

(65) Prior Publication Data

US 2005/0145597 A1    Jul. 7, 2005

(51) Int. Cl.
*B60N 2/42*    (2006.01)
*A47C 7/02*    (2006.01)

(52) U.S. Cl. .............. 297/216.1; 297/216.13; 297/452.18; 297/452.19; 297/452.2; 297/452.55

(58) Field of Classification Search ............ 297/216.1, 297/216.13, 452.18, 452.19, 452.2, 452.55
See application file for complete search history.

(56) References Cited

U.S. PATENT DOCUMENTS

| | | | | |
|---|---|---|---|---|
| 3,647,168 A | * | 3/1972 | Eggert et al. ............ | 244/122 A |
| 4,350,390 A | * | 9/1982 | Ogawa .................. | 297/452.18 |
| 4,489,978 A | * | 12/1984 | Brennan .................... | 297/232 |
| 4,898,426 A | * | 2/1990 | Schulz et al. .......... | 297/452.65 |
| 5,029,842 A | * | 7/1991 | Belanger et al. ..... | 297/45.18 X |
| 5,029,942 A | * | 7/1991 | Rink ..................... | 297/452.18 |
| 5,219,202 A | * | 6/1993 | Rink et al. ............ | 297/216.13 |
| 5,240,310 A | * | 8/1993 | Rink ..................... | 297/452.18 |
| 5,253,924 A | * | 10/1993 | Glance .............. | 297/216.13 X |
| 5,382,083 A | * | 1/1995 | Fecteau et al. ..... | 297/452.18 X |
| 5,462,339 A | * | 10/1995 | Schmale et al. ........ | 297/452.55 |
| 5,464,273 A | * | 11/1995 | Makoto ............. | 297/452.18 X |
| 5,482,351 A | * | 1/1996 | Young et al. ............ | 297/216.2 |
| 5,485,976 A | * | 1/1996 | Creed et al. ............. | 244/118.6 |
| 5,575,533 A | * | 11/1996 | Glance .................... | 297/452.2 |
| 5,597,205 A | * | 1/1997 | Glance et al. ......... | 297/362.14 |
| 5,676,421 A | * | 10/1997 | Brodsky ................ | 297/216.13 |
| 5,800,013 A | * | 9/1998 | Branham et al. ... | 297/452.18 X |
| 5,823,627 A | * | 10/1998 | Viano et al. ........ | 297/216.13 X |
| 5,836,547 A | * | 11/1998 | Koch et al. ............. | 244/122 R |
| 5,836,647 A | * | 11/1998 | Turman ................... | 297/216.1 |

(Continued)

FOREIGN PATENT DOCUMENTS

DE     4320382 A1 *  12/1994

(Continued)

*Primary Examiner*—Rodney B. White
(74) *Attorney, Agent, or Firm*—Faegre & Benson LLP

(57) ABSTRACT

A hybrid composite-metal energy absorbing seat is described. According to one embodiment, an aircraft seat includes a seat base assembly and a seat back assembly. The seat base assembly includes multiple rigid metal seat base side frame elements joined by a lower seat pan, an energy absorbing element placed on the lower seat pan to deform and absorb downward energy in a crash, and a contoured seat pan whose sides extend past the seat base side frame elements and deform to absorb downward energy in a crash. The seat back assembly is attached to the seat base assembly and includes multiple rigid metal seat back side frame elements joined by a contoured composite seat back. The rigid metal seat back side frame elements absorb forward crash load energy by permanently deforming during a severe forward crash load. The contoured composite seat back provides design/aesthetic flexibility.

31 Claims, 10 Drawing Sheets

U.S. PATENT DOCUMENTS

| | | | |
|---|---|---|---|
| 5,882,061 A * | 3/1999 | Guillouet | 296/65.05 |
| 6,010,195 A * | 1/2000 | Masters et al. | 297/452.55 |
| 6,027,171 A * | 2/2000 | Partington et al. | 297/452.18 |
| 6,056,366 A * | 5/2000 | Haynes et al. | 297/452.18 |
| 6,059,369 A * | 5/2000 | Bateson et al. | 297/452.18 |
| 6,074,004 A * | 6/2000 | Carmichael | 297/216.13 |
| 6,142,563 A * | 11/2000 | Townsend et al. | 297/216.1 |
| 6,312,056 B1 * | 11/2001 | Murphy et al. | 297/464 |
| 6,322,148 B1 * | 11/2001 | Kolena et al. | 297/452.2 |
| 6,352,304 B1 * | 3/2002 | Sorgenfrei | 297/216.13 |
| 6,378,946 B1 * | 4/2002 | Cope et al. | 297/452.18 X |
| 6,382,718 B1 * | 5/2002 | Janke et al. | 297/216.1 X |
| 6,409,263 B1 * | 6/2002 | Seibold | 297/216.13 |
| 6,550,858 B1 * | 4/2003 | Grohs et al. | 297/216.1 |
| 6,625,830 B1 * | 9/2003 | Lampel | 5/653 |
| 6,644,738 B1 * | 11/2003 | Williamson | 297/232 |
| 6,669,295 B1 * | 12/2003 | Williamson | 297/362.13 |
| 6,672,661 B1 * | 1/2004 | Williamson | 297/232 |
| 6,688,700 B1 * | 2/2004 | Gupta et al. | 297/452.18 |
| 6,733,075 B1 * | 5/2004 | Schumann et al. | 297/344.12 |
| 6,742,838 B1 * | 6/2004 | Swierczewski | 297/216.1 |
| 6,749,266 B1 * | 6/2004 | Williamson | 297/452.2 |
| 6,896,324 B1 * | 5/2005 | Kull et al. | 297/216.1 |
| 2003/0075968 A1 * | 4/2003 | Gupta et al. | 297/452.18 |
| 2003/0117003 A1 * | 6/2003 | Fourrey et al. | 297/452.18 |
| 2003/0197413 A1 * | 10/2003 | Walker et al. | 297/452.19 |
| 2004/0036326 A1 * | 2/2004 | Bajic et al. | 297/180.14 |
| 2004/0075313 A1 * | 4/2004 | Taoka et al. | 297/216.16 |

FOREIGN PATENT DOCUMENTS

| | | | | |
|---|---|---|---|---|
| GB | 2087226 A | * | 5/1982 | 297/161.1 |
| JP | 04231913 A | * | 8/1992 | 297/216.1 |
| WO | WO 02/13023 | | 2/2002 | |

* cited by examiner

HYBRID COMPOSITE-METAL ENERGY ABSORBING SEAT

This application claims the benefit of U.S. Provisional Application No. 60/373,986, filed Apr. 19, 2002 and U.S. Provisional Application No. 60/378,195, filed May 6, 2002; U.S. Utility Patent Application No. 10/420,566 filed Apr. 21, 2003, now U.S. Pat. No. 6,896,324, all of which are hereby incorporated by reference in their entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention generally relate to a simple, lightweight and affordable seat structure. More particularly, embodiments of the present invention relate to a hybrid composite-metal seat assembly intended for use as an energy absorbing aircraft seat and meeting the current Federal Aviation Regulations (FAR) Part 23 normal category aircraft requirements ("FAR Part 23").

2. Description of the Related Art

Conventional aluminum seats have numerous expensive small components, which contribute to excessive assembly time and increased cost. In addition, it is often difficult to form the complex geometry that might be preferred for interior styling.

Although composite seats are less expensive to assemble and can be used to form complex shapes, there is insufficient design data relating to crash/high-speed deformation environments. Also contributing to the inavailability of crash test data is that fact that composites don't plastically deform— thus making crash reaction calculations difficult.

SUMMARY

A hybrid composite-metal energy absorbing seat is described. Embodiments of the present invention seek to provide an improved seat which finds particular usefulness in aircraft applications, and which includes a novel force dissipation assembly. According to one embodiment, the seat includes a seat base assembly and a seat back assembly. The seat base assembly includes multiple rigid metal seat base side frame elements joined by a seat pan assembly and covered with a seat pan cover. An energy absorbing element in the seat pan assembly serves as a downward load energy absorber to absorb severe downward crash load energy. Additionally, deformation of the seat pan cover also serves to absorb downward crash load energy. These two mechanisms can be used together or individually depending upon the energy absorption requirements of the seat environment. The seat back assembly is attached to the seat base assembly. The seat back assembly includes multiple rigid metal seat back side frame elements joined by a contoured composite seat back. The rigid metal seat back side frame elements absorb forward crash load energy by permanently deforming during a severe forward crash load. The contoured composite seat back and contoured composite seat pan provide design/aesthetic flexibility.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1A:
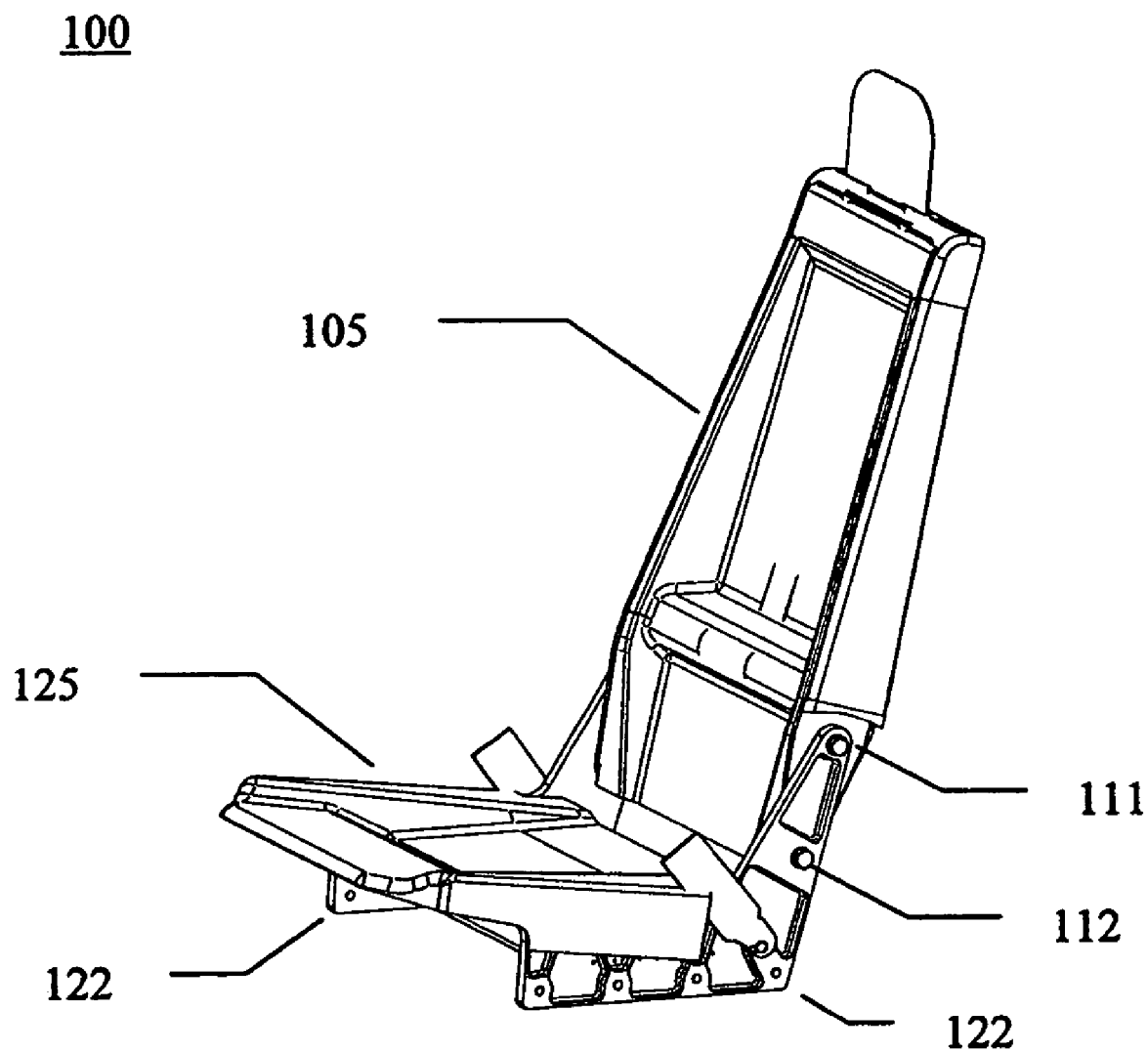
FIG. 1A depicts a crew seat assembly according to one embodiment of the present invention.

A cost effective hybrid composite-metal energy absorbing aircraft seat is described that provides a strong, lightweight structure for enhanced occupant safety. Broadly stated, embodiments of the present invention seek to achieve an appropriate combination of composite and metal parts in a way that meets current FAR Part 23 requirements while reducing part count, part cost and assembly cost to provide an affordable aircraft seat.

Embodiments of the present invention also seek to provide a seat which includes a portion having a deformable core, and wherein the seat further includes an assembly which engages the deformable core during a mishap, or crash, thereby further dissipating some of the force of the crash.

Embodiments of the present invention may be manufactured as original equipment, or alternatively may be manufactured in the nature of a retrofit. A goal of various embodiments of the present invention is to provide a seat which is relatively simple in design, easy to install, and which requires no substantial alteration of the cabin of the aircraft to accommodate installation.

Embodiments of the present invention also provide aesthetic flexibility to seat designers by maintaining seat back loads primarily in rigid metal side members, thereby allowing the shape of the composite seat back to be customized aesthetically without significantly affecting crashworthiness of the seat.

An object of one embodiment of the present invention is to provide a seat having a force dissipation assembly which is lightweight, compact, efficient, and further can be purchased at a relatively nominal price.

An object of one embodiment of the present invention is to provide a seat which is characterized by ease of utilization, simplicity of construction, and which further operates in the absence of external sources of power.

An object of one embodiment of the present invention is to provide improved elements and arrangements thereof in a seat for the purposes described and which is dependable, economical and durable.

According to one embodiment, a simple seat pan assembly serves as a downward load energy absorber to absorb severe downward crash load energy. For example, an energy absorber may be contained within a simple lower seat pan or a contoured seat pan cover may be placed over the two rigid seat base sides or a combination of both an energy absorber and a contoured seat pan cover may be employed.

According to one embodiment, metal parts, such as aluminum, are used for components of the seat assemblies that need to plastically deform in a predictable manner whereas composite materials, such as carbon fiber, are used for complex shaped components of the seat that do not need to plastically deform and for integration of multiple structural elements into a single component. Advantageously, in this manner, a seat can be provided that enhances occupant safety and can be produced, constructed, and installed relatively inexpensively while allowing for a variety of aesthetically pleasing shapes to be achieved. Other features of embodiments of the present invention will be apparent from the accompanying drawings and from the description that follows.

In the following description, for the purposes of explanation, numerous specific details are set forth in order to provide a thorough understanding of embodiments of the present invention. It will be apparent, however, to one skilled in the art that various embodiments of the present invention may be practiced without some of these specific details. In other instances, well-known structures and devices are shown in block diagram form.

For convenience, embodiments of the present invention are described with reference to a crew aircraft seat. However, embodiments of the present invention are thought to be equally applicable in various other environments, such as aircraft passenger (main cabin area) seats, helicopter seats, flight attendant seats, ejection seats of fighter aircraft, automobiles, including trucks, racing cars, buses, watercraft, trains and the like. Consequently, while embodiments of the present invention are thought to be particularly useful in aircraft and specifically in the cockpit, the present invention is not limited to application within any particular environment. Additionally, while embodiments of the present invention are described with reference to a particular lamination methodology, those skilled in the field of composites will readily understand that various other composite processing technologies may be employed, including, but not limited to thermoset resin injection pultrusion (RIP), thermoplastic pultrusion, prepreg formation, sheet/bulk molding compounds (SMC/BMC) compression molding, injection-compression molding, preforming of thermoformable fabrics, compression molding of thermoplastic composites, transfer molding, squeezing flow rheology, wet layup, prepreg, RTM, VARTM, or other standard composite manufacturing processes.

Finally, while in the embodiments described herein the primary forward load energy absorption is accomplished by rigid metal seat back side frame elements and seat base side frame elements, this new energy absorption technique may be combined with more traditional seat energy absorbing devices like deforming legs (see, e.g., U.S. Pat. Nos. 5,662,376 and 5,482,351), shock absorbers in legs, etc. to create an even more effective energy absorbing seat.

Terminology

Brief definitions of terms used in this application are given below.

The term "composite" generally refers to a material created by the macroscopic combination of two or more distinct materials (e.g., a reinforcing element or filler and a compatible matrix binder) to obtain specific characteristics and properties. The components of a composite, typically fibers and resin, retain their identities; that is, they do not dissolve or merge completely into one another. Examples of composites include, but are not limited to, carbon fiber reinforced epoxy prepreg, glass fiber reinforced epoxy prepreg, and other combinations of fibers and resins or matrix materials. Such combinations include glass, carbon, boron, Kevlar™, aramid, and other fibers or fiberous materials along with epoxy, polyester, vinylester, nylon, ABS, PPS, PEEK, and other thermosetting or thermoplastic matrix materials.

The terms "connected", "coupled" or "joined" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The term "laminate" generally refers to a composite structure composed of multiple layers of cloth, fabric, and/or unidirectional tape and resin, laminated or bonded together.

The term "responsive" includes completely or partially responsive.

The term "truss" generally refers to a rigid frame of members in tension and compression joined to form a series of triangles, other stable shapes, or a combination thereof. A truss is characterized by open construction that is lighter than, yet just as strong as, a beam with a solid web between upper and lower lines. A thin web may be used in combination with a truss structure to simplify manufacturing, provide additional strength and stiffness, or provide additional attachment points than a traditional truss.

The term "energy absorber" generally refers to any material or material form that absorbs dynamic energy without significant rebound following impact. For example, water is an energy absorber since a ball will not bounce very high if dropped onto a surface of water. Energy absorbing materials used in the context of this patent include, but are not limited to, aluminum honeycomb (some of which is specifically tailored for improved energy absorbing characteristics, but even standard aluminum honeycomb absorbs energy well when crushed), honeycombs of other materials such as Nomex™, carbon, Kevlar™ or even paper, many open or closed-cell foams, or viscoelastic materials as those sold by Oregon Aero, EAR Corp, 3M, and many others.

The term "metal" generally refers to, but is not limited to, common aerospace materials such as 2024, 6061, and 7075 aluminum in various tempers, along with steels such as 4130, 301, and 17-4PH.

Figure 1B:
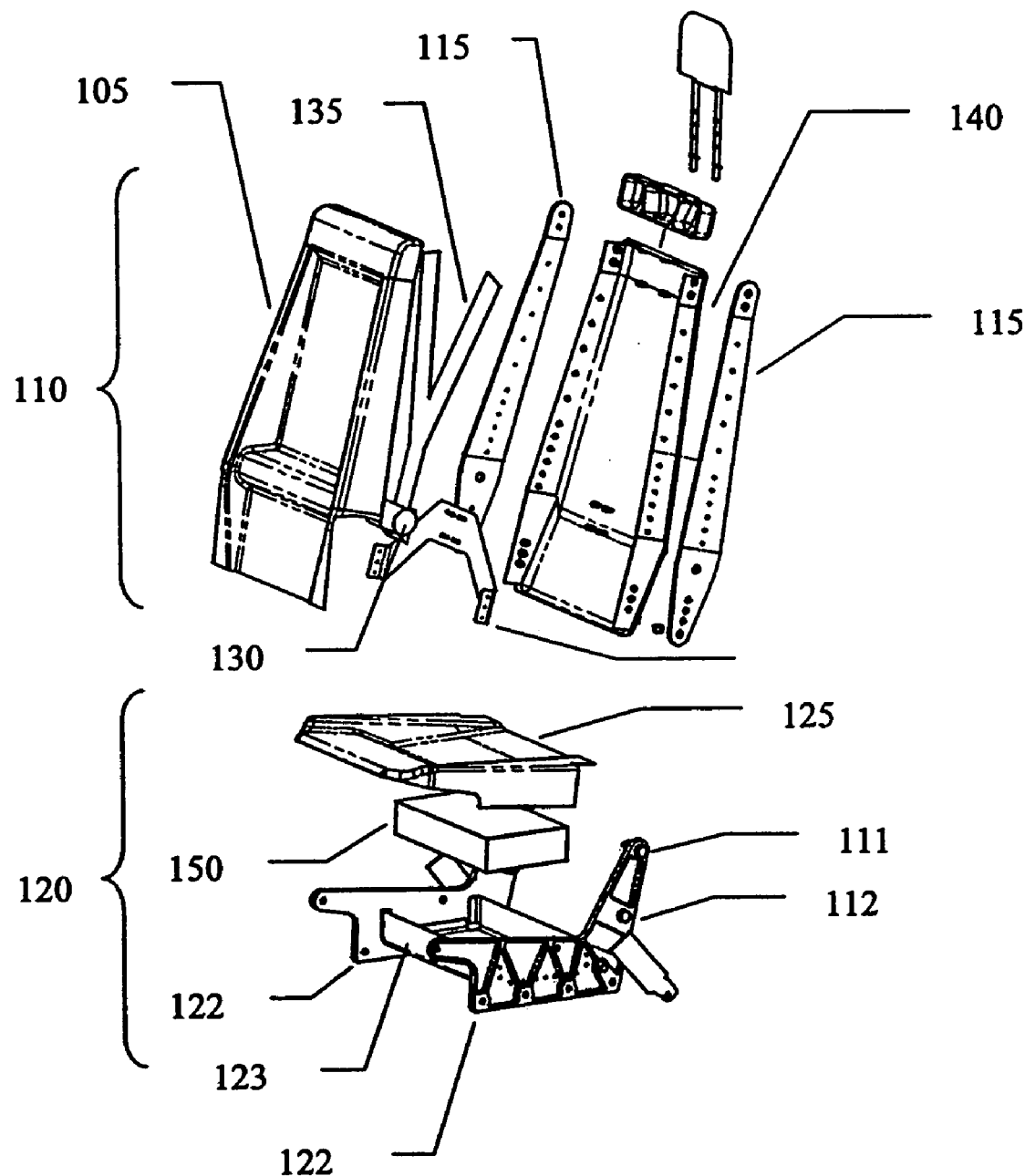
FIG. 1B is an exploded view of the crew seat assembly of FIG. 1.

FIGS. 1A and 1B depict a crew seat assembly 100 according to one embodiment of the present invention. In the embodiment depicted, the crew seat assembly 100 includes an upper seat back assembly 110 and a lower seat (seat base) assembly 120. For clarity, foam and leather layers that would ordinarily be included for comfort and aesthetics are not shown.

The upper seat back assembly 110 and the lower seat assembly 120 are typically either pinned or bolted to allow a fixed seat back position or a foldable seat back. In the example depicted, the seat back assembly 110 and the seat base assembly 120 are attached at a primary seat back pivot (hinge) point 111 and the upper seat back assembly 110 is locked in place with a pin assembly at a primary seat back latch point 112. Pin assembly can include a mechanism that allows one of the two pins to pull out of joint and allow seat back to fold down. Additionally, several pinning locations would allow the seat back to be adjusted to several seat back angles for comfort.

The seat base assembly 120 includes two rigid seat base side frame elements 122 and a seat pan assembly, including a lower seat pan 123, which may contain an optional seat energy absorber assembly 150, and a molded upper seat pan cover 125. According to one embodiment, the seat pan assembly serves as a downward load energy absorber to absorb severe downward crash load energy. For example, an energy absorber may be contained within the lower seat pan 123 or the molded upper seat pan cover 125 may be placed over the two rigid seat base sides 122 or a combination of both the seat energy absorber assembly 150 and the seat pan cover 125 may be employed. Further details regarding these and various other parts and their functions are provided below.

The upper seat back assembly 110 includes two rigid seat back side frame elements 115 joined together by a molded inner seat back shell 105 and a molded outer seat back shell 140. The molded inner seat back shell 105 and the molded outer seat back shell 140 house an integrated shoulder belt harness system, including an inertia reel 130, and shoulder belt 135 attached to the upper seat assembly with the inertia reel strap 135.

Figure 2:
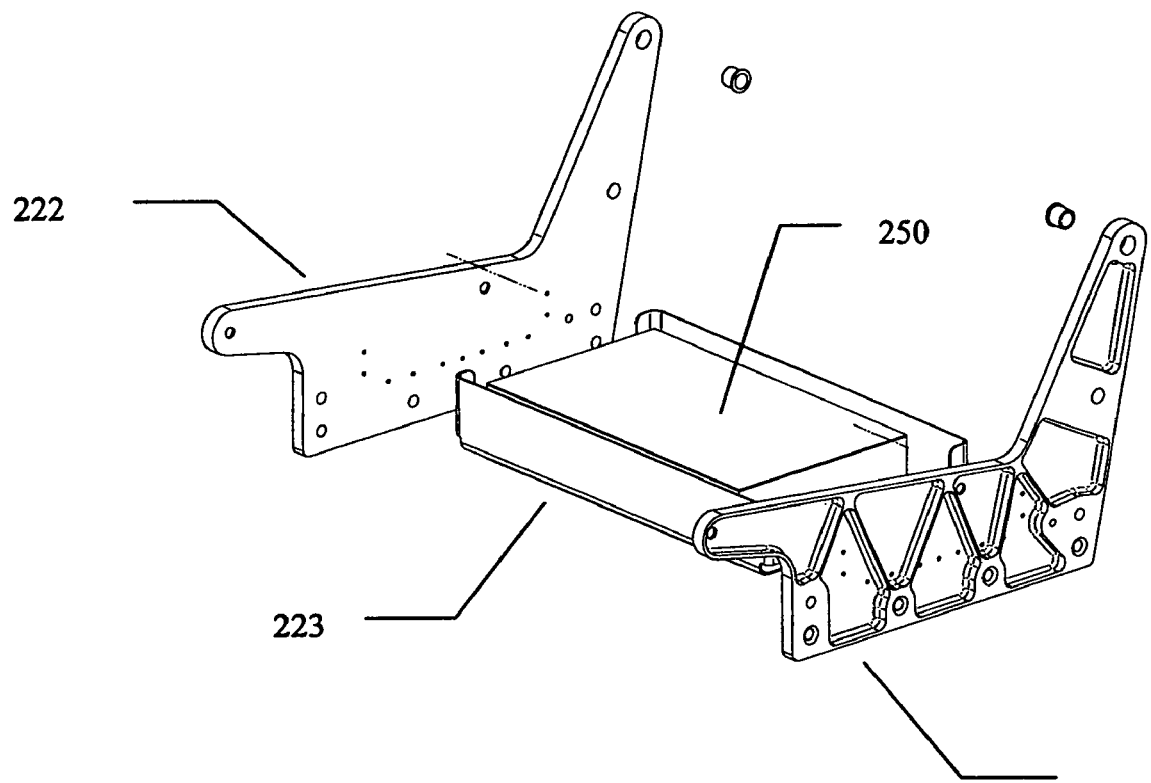
FIG. 2 is a partially exploded view of a portion of a seat base assembly according to one embodiment of the present invention.

FIG. 2 is a partially exploded view of a portion of a seat base assembly 200 according to one embodiment of the present invention. In the embodiment depicted, the seat base assembly 200 includes two rigid seat base side frame elements 222, a seat pan 223, and a seat energy absorber assembly 250.

The seat base side frame elements 222 and lower seat pan 223 maintain appropriate rigidity in the presence of normal forward loads and are not required to deform plastically in an emergency situation to absorb energy. The seat base side frame elements 222 may be machined out of aluminum plates to form rigid trussed structures.

The seat pan 223 is interposed between the two seat base side frame elements 222 and positioned substantially under the base of the occupant's spinal column.

According to the embodiment depicted, the box formed by the lower seat pan 223 allows for insertion of the seat energy absorber assembly 250 which comprises "crush zone" material to prevent spinal injury and absorbs downloads.

In alternative embodiments, the seat energy absorber assembly 250 is not included and download energy absorption is addressed by the molded seat pan cover 125 and/or other energy absorption devices.

Figure 3:
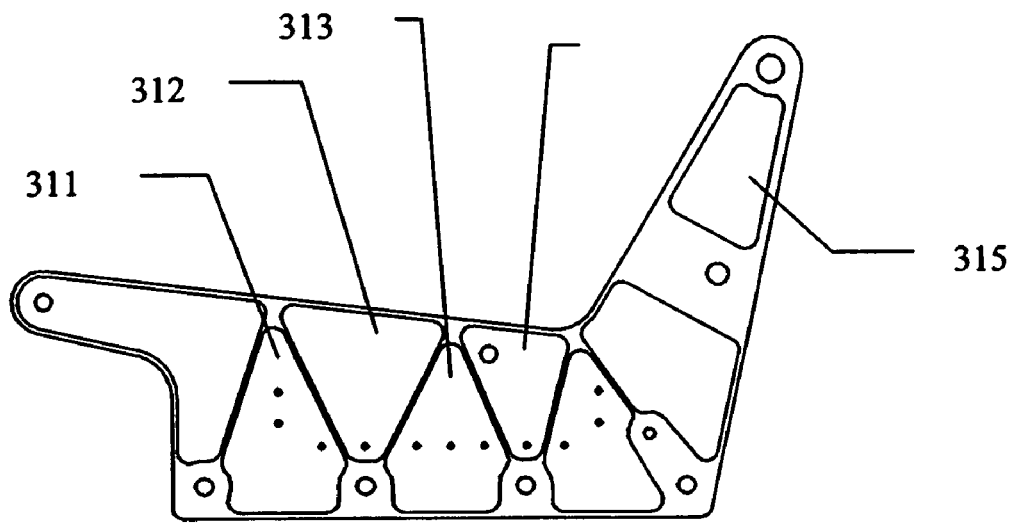
FIG. 3 depicts a side view of a seat base side frame element according to one embodiment of the present invention.

FIG. 3 depicts a side view of a seat base side frame element 322 according to one embodiment of the present invention. In this example, the seat base side frame elements 322 are trussed and may be machined out of 0.75" aluminum plate to form a rigid truss or webbed truss having multiple triangular shaped recesses 311–315 with members having thickness on the order of approximately 0.125" to 0.25". In alternative embodiments, the seat base side frame element 322 may not be trussed. Furthermore, other metals or alloys may be employed, the metal plate may be on the order of approximately 0.5" to 1", and other stable shapes may be formed by the recesses.

According to one embodiment, the seat base side frame elements in combination with the seat back side frame elements are the primary forward load absorption mechanism. For example, both pairs of side frame elements may absorb forward crash load energy by permanently deforming during a severe forward crash load.

Figure 4:
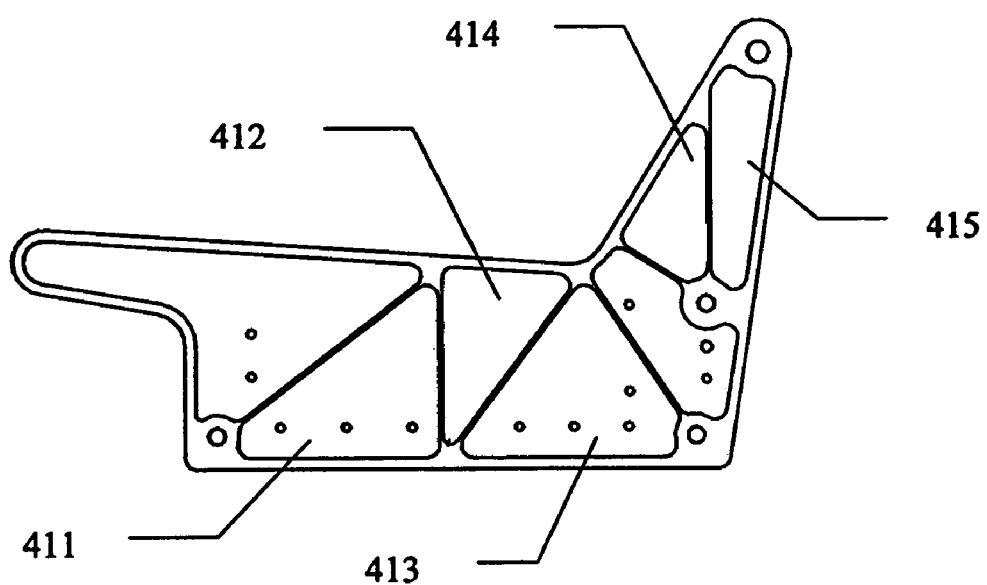
FIG. 4 depicts a side view of a seat base side frame element according to an alternative embodiment of the present invention.

Various other arrangements and combinations of trussed structures are contemplated. FIG. 4 depicts a side view of a seat base side frame element according to an alternative embodiment of the present invention. Other combinations necessary to group multiple seats together, as commonly found in an airliner with 2, 3, or more seats in a row, are also envisioned.

Figure 5:
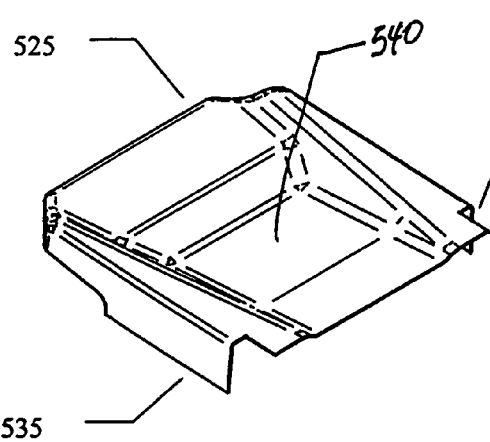
FIG. 5 depicts a trimetric view of a molded seat pan cover according to one embodiment of the present invention.

FIG. 5 depicts a trimetric view of a molded seat pan cover 525 according to one embodiment of the present invention. In this embodiment, the molded seat pan cover includes sides 535 configured to extend across the rigid seat base side frame elements 122 to provide energy absorption capability in a download by deforming up and over the rigid seat base side frame elements and allowing a center portion 540 of the molded composite seat cover to deflect downwards.

According to one embodiment, the molded seat pan cover 525 is lightly fastened by fasteners to the plurality of rigid seat base side frame elements with the fasteners which shear out in a download. In another embodiment, the molded seat pan cover is not fastened to the rigid seat base side frame elements. According to one embodiment, the molded seat pan cover 525 is fabricated of composite materials, such as carbon fiber. In such a case, materials and fiber orientations are used such that the composite seat pan cover 525 has desired download energy absorbing capabilities, including delaminations, during a severe downward crash load as the sides of the cover deform up and over the sides of the rigid metal seat base side frame elements. In one embodiment, the molded seat pan cover 525 serves as the primary download energy absorber. In other embodiments, additional download energy absorption components are included to work in cooperation with the composite molded seat pan cover 525 or are provided as a substitute for download energy absorption capabilities in the composite molded seat pan cover 525.

According to an alternate embodiment, the molded seat pan cover 525 is fabricated of metal, such as a plastically formed aluminum sheet. This is particularly appropriate for certain high rate production situations. This metal seat pan cover would also absorb energy as the sides of the pan deform up and over the sides of the rigid metal seat base side frame elements.

Figure 6:
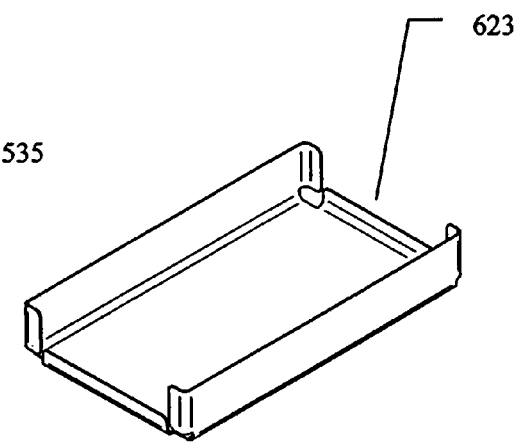
FIG. 6 depicts a trimetric view of a lower seat pan according to one embodiment of the present invention.

FIG. 6 depicts a trimetric view of a seat pan 623 according to one embodiment of the present invention. According to one embodiment, the seat pan 623 is formed of sheet metal, such as 0.063" aluminum sheet. Alternatively, the seat pan 623 may be fabricated of composite materials, such as carbon fiber.

Figure 7:
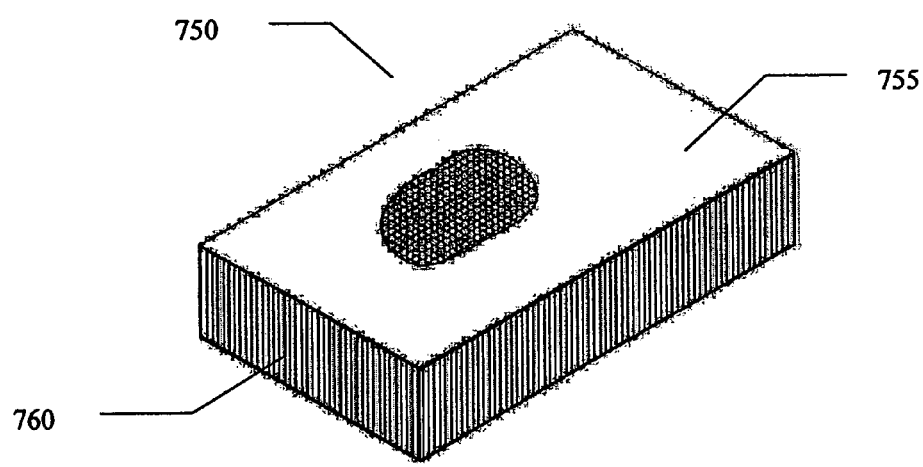
FIG. 7 depicts a trimetric view of a seat energy absorber assembly according to one embodiment of the present invention.

FIG. 7 depicts a trimetric view of a seat energy absorber assembly 750 according to one embodiment of the present invention. Depending upon the particular design constraints of the seat, the download energy absorber may comprise a block of honeycomb made of aluminum, Nomex™ material, carbon, Kevlar™ material, paper or a variety of other honeycomb or foam materials with energy absorbing characteristics. According to one embodiment, the download energy absorber is a block of open or closed-cell foam or a block of viscoelastic materials.

Figure 8:
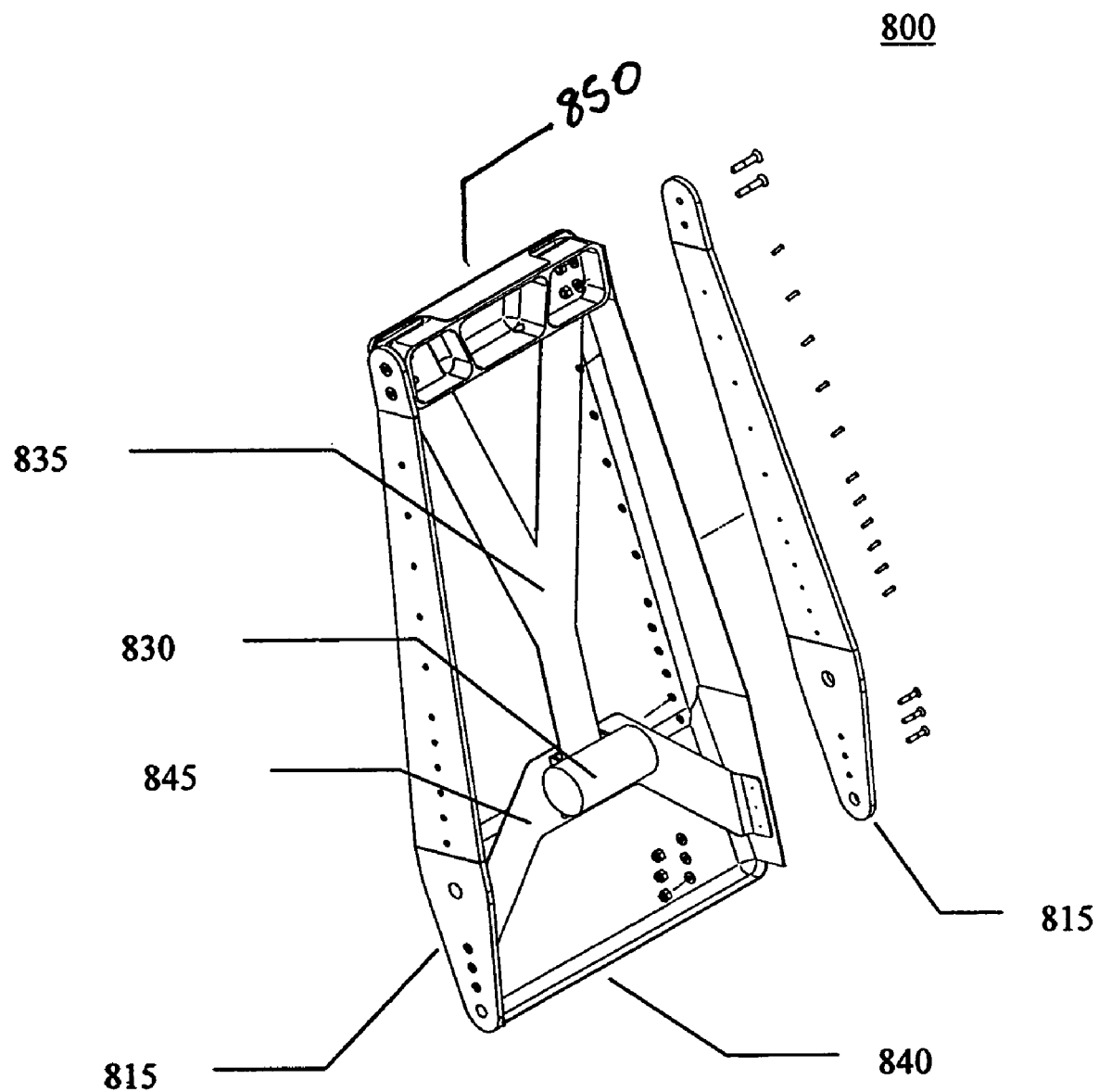
FIG. 8 is an exploded view of a portion of a seat back assembly according to one embodiment of the present invention.

FIG. 8 is an exploded view of a portion of a seat back assembly 800 according to one embodiment of the present invention. In the portion of the embodiment depicted, the seat back assembly 800 includes two seat back support frame elements 815, a molded outer seat back shell 840, and an integrated shoulder belt harness system including an inertia reel 830 and shoulder belt 835 attached to an inertia reel strap 845, shoulder strap guide/headrest retainer 850, and a shoulder belt 835.

As mentioned above, according to one embodiment, metal parts are used for components of the seat that for which it is desirable to have plastically deform in a predictable manner whereas composite materials, such as carbon fiber, are used for complex shaped components of the seat that do not need to plastically deform and for integration of multiple structural elements into a single component.

In some embodiments, the seat back side elements are fabricated of composite materials or are integrated into a reduced part-count or single piece seat back assembly. In such instances, materials and fiber orientations are used such that the composite seat back has energy absorbing capabilities similar to the metal seat back side frame elements 815 which absorb energy by permanently deforming during a severe forward crash load.

According to one embodiment, the seat back side frame elements 815 are attached to the molded outer seat back shell 840 with rivets, machine screws and/or the like. The seat back side frame elements 815 are designed to provide predictable plastic deformation under emergency situations.

The molded outer seat back shell 840 and the molded inner seat back shell 105 together form a housing for the integral shoulder belt harness system to conceal and protect the inertia reel 830 and shoulder harness 835. The molded outer seat back shell 840 and the molded inner seat back shell 105 together also serve to provide stability to the seat back side frame elements 815 during emergency situations by keeping the seat back side frame elements 815 aligned appropriately for plastic deformation and preventing undesired rotation and folding. This stability is provided when subjected to either forward or aft facing crash loads, thus seats incorporating these designs may be installed facing either forward or aft in the vehicle.

In the embodiment depicted, due to the positioning and attachment of the inertia reel 830 internal to the molded outer seat back shell 840 and seat back support frame elements 815, the primary shoulder belt crash loads stay in the seat back side frame elements 815 and down through the seat back hinge/latch points into the seat base side frame elements 122 thereby allowing for appropriate plastic deformations in crash scenarios.

In one embodiment, adjustable shoulder belts are rigidly attached to the shoulder belt guide 850, eliminating the inertia reel and inertia reel strap.

Figure 9:
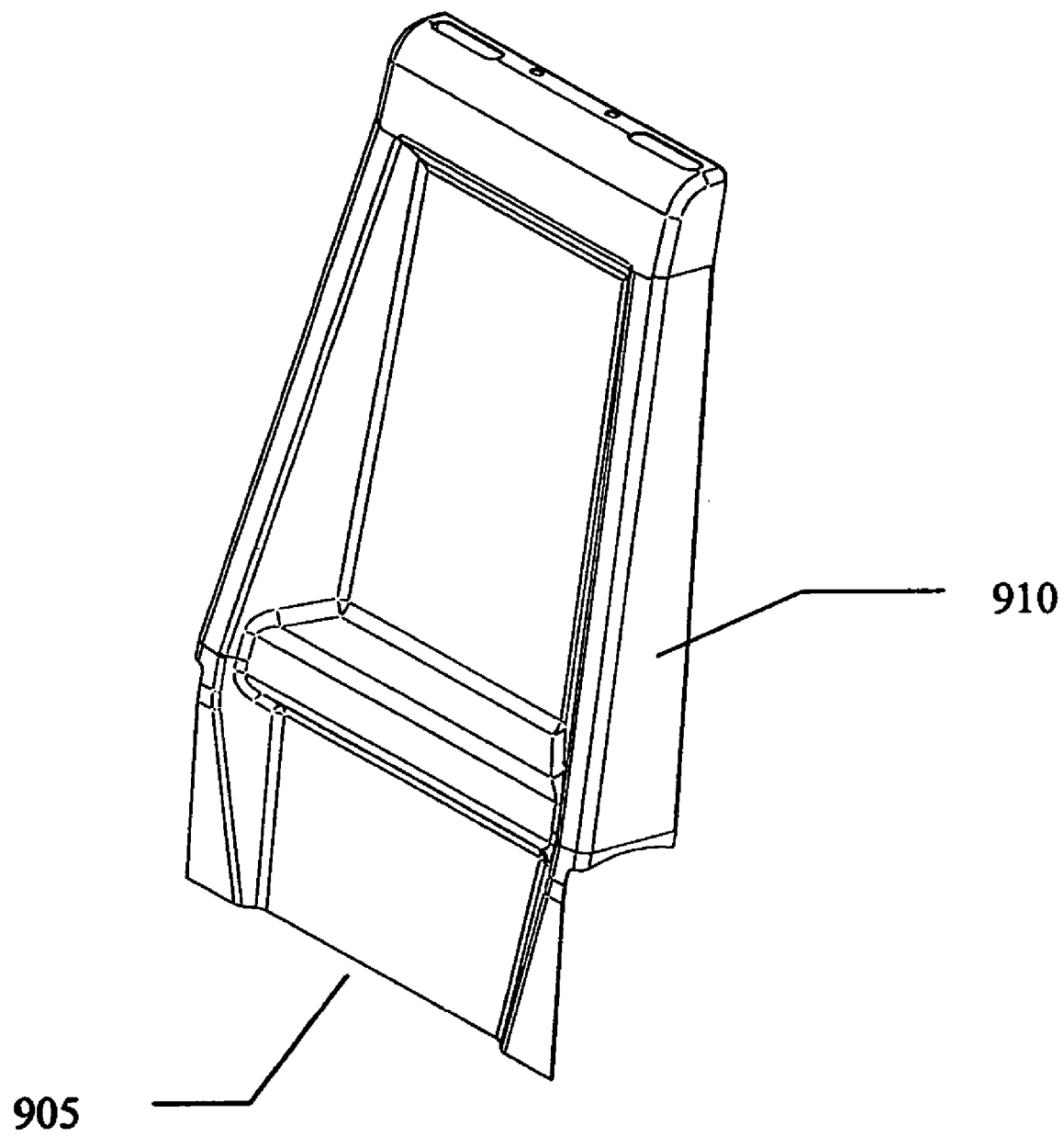
FIG. 9 depicts a trimetric view of a molded inner seat back shell according to one embodiment of the present invention.

FIG. 9 depicts a trimetric view of a molded inner seat back shell 905 according to one embodiment of the present invention. According to one embodiment, the molded inner seat back shell 905 is fabricated of composite materials, such as carbon fiber. Advantageously, in this manner, the inner seat back shell 905 provides design/aesthetic flexibility by allowing contours and/or complex geometry to be formed that might be preferred for interior styling.

Notably, in addition to the design flexibility provided, composites have a very high potential for absorbing kinetic energy during a crash (most bullet proof vests are made of composites). The composite energy absorption capability offers a unique combination of reduced structural weight with an increases crash resistance compared to metallic structures. Consequently, embodiments of the present invention are contemplated in which the seat back becomes a single composite piece (instead of the current metal seat back sides and composite seat back) and much of the seat base is combined into a single composite piece (containing the seat base sides and lower seat pan). The various composite structures described herein may be formed of laminate, e.g., multiple layers of composite materials, such as carbon fiber, laminated together. In one embodiment, the carbon fiber structure is comprised of a laminated prepreg composite structure having a service temperature of 180° F.

In the embodiment depicted, the molded inner seat back shell 905 includes sides 910 configured to extend across the rigid seat back side frame elements 115 to provide stability to the seat back side frame elements 115 during emergency situations by keeping the seat back side frame elements 115 aligned appropriately for plastic deformation and preventing undesired rotation and folding. Additionally, the sides 910 provide energy absorption capability in crash loads when the seat is installed facing the opposite direction by deforming up and over the rigid seat back side frame elements 115 and allowing a center portion of the molded seat back shell 905 to deflect inward. Consequently, both energy absorption and stability are provided when subjected to either forward or aft facing crash loads and seats incorporating embodiments of the present invention may be installed facing either forward or aft in the vehicle.

Figure 10:
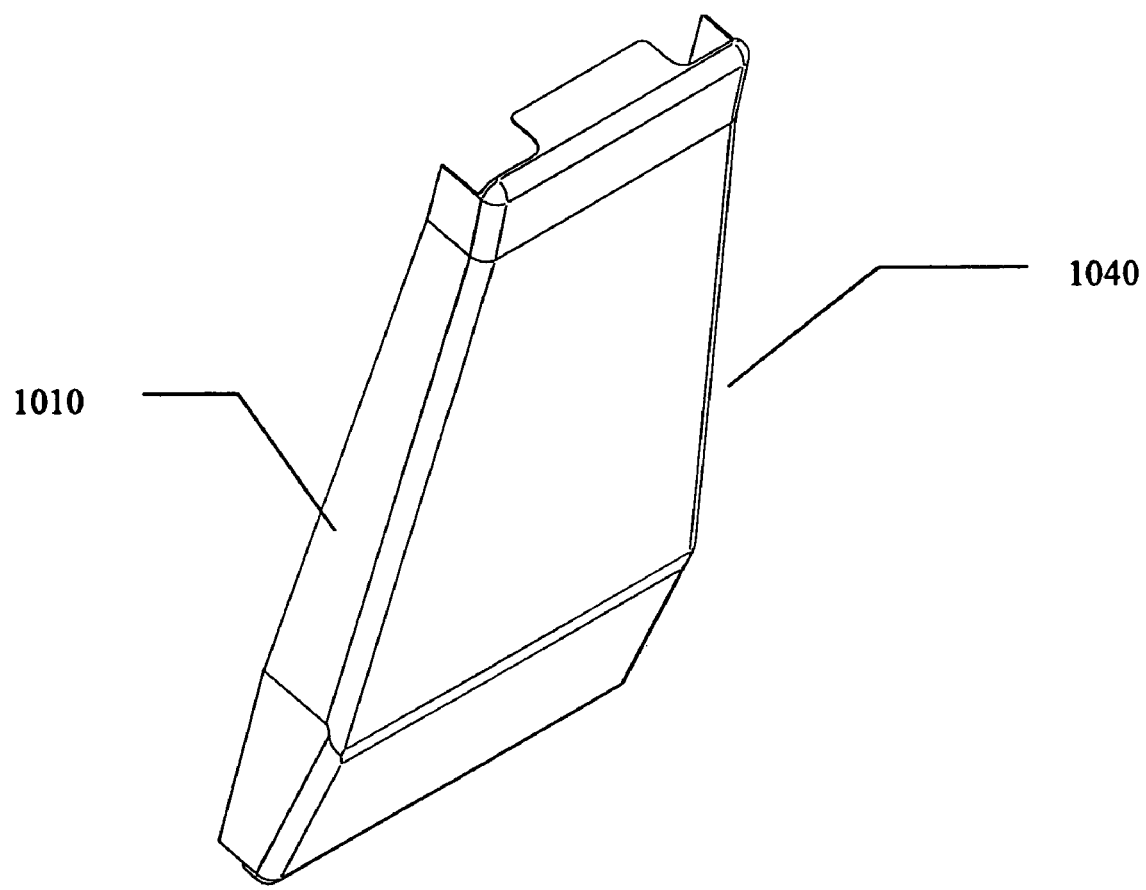
FIG. 10 depicts a trimetric view of a molded outer seat back shell according to one embodiment of the present invention.

FIG. 10 depicts a trimetric view of a molded outer seat back shell 1040 according to one embodiment of the present invention. Typically, it will be convenient to form the molded inner seat back shell 1040 of the same material employed for the outer seat back shell 905. However, in alternative embodiments, different materials and/or composite processing techniques may be used depending on the design constraints.

According to one embodiment, the molded outer seat back shell 1040 is fabricated of composite materials, such as carbon fiber. Advantageously, as above, the outer seat back shell 1040 also provides for design/aesthetic flexibility by allowing contours and/or complex geometry to be formed that might be preferred for interior styling.

In the embodiment depicted, the molded outer seat back shell 1040 also includes sides 1010 configured to extend across the rigid seat back side frame elements 115 to provide stability to the seat back side frame elements 115 during emergency situations by keeping the seat back side frame elements 115 aligned appropriately for plastic deformation and preventing undesired rotation and folding.

Figure 11A:
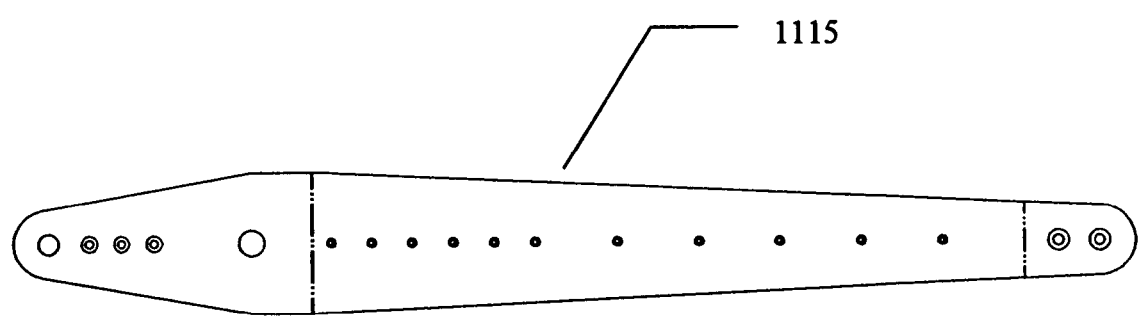
FIG. 11A depicts a side view of a seat back side frame element according to one embodiment of the present invention.
Figure 11B:
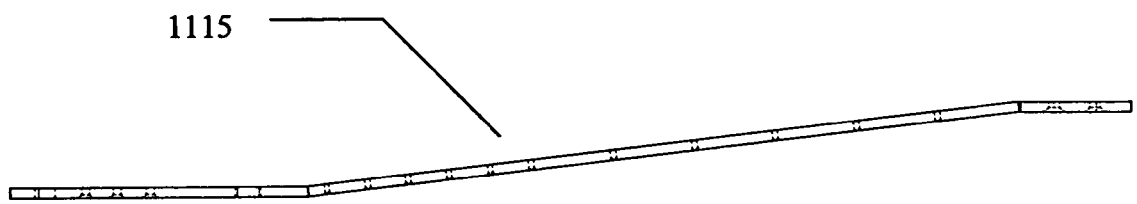
FIG. 11B depicts a front view of a seat back side frame element according to one embodiment of the present invention.

FIGS. 11A and 11B depicts side and front views, respectively, of a seat back side frame element 1115 according to one embodiment of the present invention. In one embodiment, the seat back side frame elements 1115 are formed from a 0.25" sheet of metal, such as aluminum, mixed metals, or a metallic alloy, such as steel. In this manner, the seat back support frame elements 1115 may be easily altered to accommodate interior space need and/or aesthetic purposes. In alternative embodiments, the seat back support frame elements 1115 may be machined from a thicker metal plate to form a truss-like structure as shown in FIG. 12, for example.

As can be seen from the side view, in the embodiment depicted, the seat back side frame elements 1115 are shaped to accommodate the tapered form of the overall upper seat back assembly 110 while maintaining appropriate rigidity in the presence of forward and aft loads.

Figure 12:
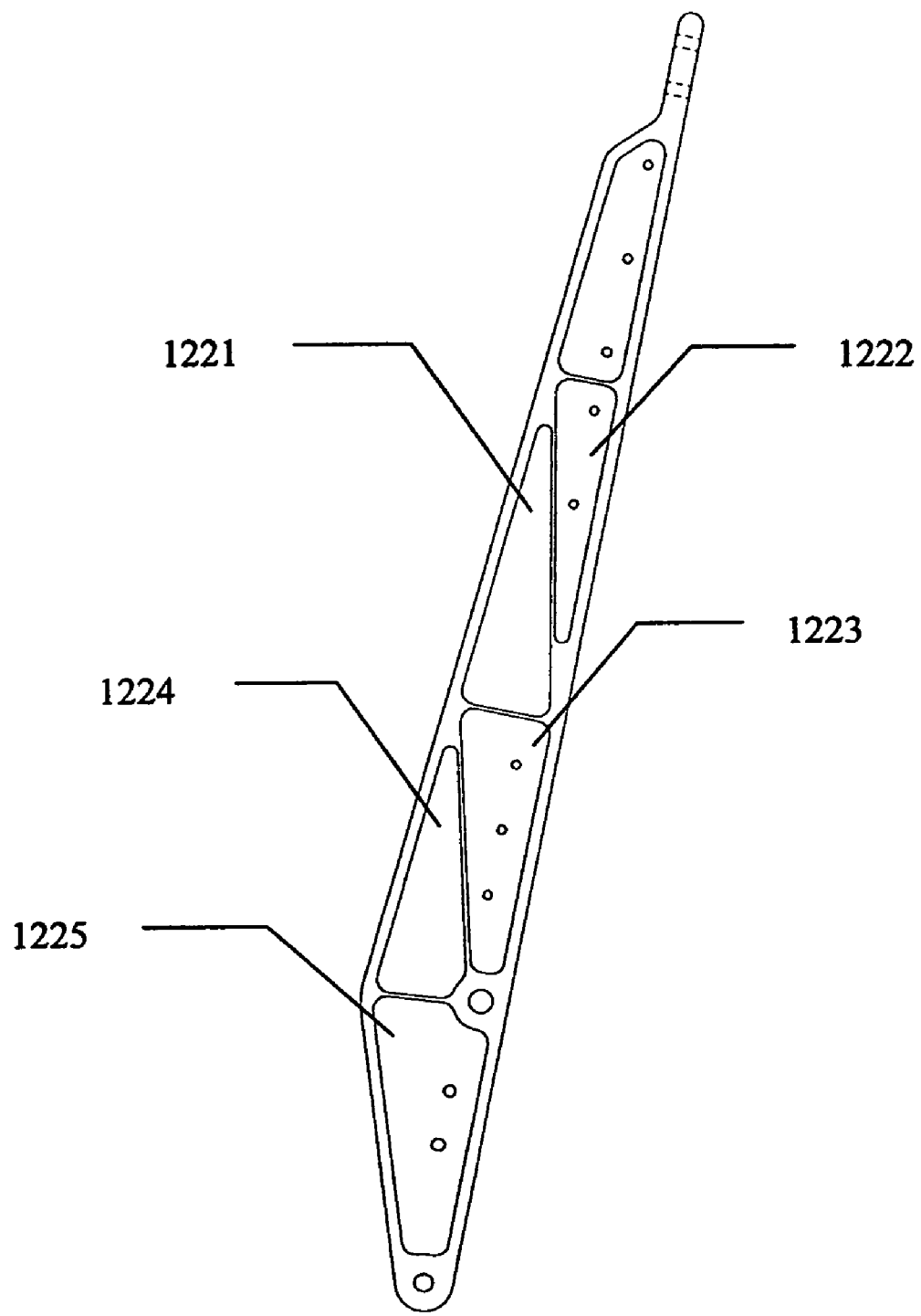
FIG. 12 depicts a seat back side frame element according to an alternative embodiment of the present invention.

FIG. 12 depicts a seat back side frame element 1215 according to an alternative embodiment of the present invention. According to this embodiment, the seat back side frame elements 1215 are machined out of 0.75" aluminum plates forming rigid truss structures having multiple triangular recesses 1221–1225 with members having thickness on the order of approximately 0.06" to 0.25". In alternative embodiments, other metals or alloys may be employed, the plates may be on the order of approximately 0.5" to 1", and other stable shapes may be formed by the recesses.

In the foregoing specification, the invention has been described with reference to specific embodiments thereof. It will, however, be evident that various modifications and changes may be made thereto without departing from the broader spirit and scope of the invention. One of the features of this energy absorbing seat design is its ability to be modified according to aesthetic preferences, while retaining basic seat crashworthiness and energy absorbing capabilities. The specification and drawings are, accordingly, to be regarded in an illustrative rather than a restrictive sense.

What is claimed is:

1. An energy absorbent seat comprising:
a seat base assembly, wherein the seat base assembly includes a plurality of rigid seat base side frame elements joined by a seat pan assembly, wherein at least one of the plurality of seat base side frame elements is designed to absorb forward crash energy through inelastic deformation, and wherein the seat pan assembly is designed to absorb downward crash energy through inelastic deformation; and
a seat back assembly attached to the seat base assembly, wherein the seat back assembly includes a plurality of rigid seat back side frame elements joined by a seat back, wherein at least one of the plurality of rigid seat back side frame elements is designed to absorb forward crash energy through inelastic deformation.

2. The seat of claim 1, wherein the seat pan assembly includes a block of honeycombed material, and wherein the block of honeycombed material is capable of absorbing energy by inelastic deformation.

3. The seat of claim 2, wherein the block of honeycombed material is aluminum.

4. The seat of claim 3, wherein at least one side of the block of aluminum honeycombed material is bonded to a sidewall.

5. The seat of claim 2, wherein the honeycomb openings of the block of honeycomb material are aligned such that they form a plane approximately parallel to a seating surface.

6. An aircraft seat, wherein the aircraft seat comprises:
a seat base assembly designed to absorb both forward energy and downward energy of the magnitude exhibited in an aircraft crash; and
a seat back assembly attached to the seat base assembly, wherein the seat back assembly is designed to absorb forward energy of the magnitude exhibited in an aircraft crash.

7. The aircraft seat of claim 6, wherein the seat base assembly is designed to permanently deform when exposed to at least one of the forward energy and the downward energy, and wherein the deformation absorbs energy.

8. The aircraft seat of claim 7, wherein the seat base assembly includes a block of honeycomb aluminum material.

9. The aircraft seat of claim 6, wherein the seat back assembly is designed to permanently deform when exposed to the forward energy, and wherein the deformation absorbs energy.

10. The aircraft seat of claim 6, wherein a first sidewall is attached to a first side of the block of honeycomb aluminum material, and wherein a second sidewall is attached to an opposing side of the honeycomb aluminum material.

11. The aircraft seat of claim 6, wherein the first sidewall covers honeycomb openings in the aluminum honeycombed material.

12. A hybrid composite-metal energy absorbing seat comprising:
a seat base assembly, wherein the seat base assembly includes a plurality of rigid metal seat base side frame elements joined by a seat pan assembly, and wherein the plurality of rigid metal seat base side frame elements are designed to absorb forward crash energy by permanently deforming and; and
a seat back assembly attached to the seat base assembly, wherein the seat back assembly includes a plurality of rigid metal seat back side frame elements jointed by a contoured composite seat back, the plurality of rigid metal seat back side frame elements to absorb forward crash load energy by permanently deforming during a severe forward crash load, the contoured composite seat back providing design/aesthetic flexibility.

13. The seat of claim 12, wherein the seat pan assembly is designed to permanently deform when exposed to a downward crash energy.

14. The seat of claim 13, wherein the seat pan assembly includes a seat pan and a block of energy absorbing material.

15. The seat of claim 14, wherein the block of energy absorbing material is a block of honeycombed material.

16. The seat of claim 15, wherein the block of honeycombed material is selected from a group consisting of: aluminum, paper, carbon, Nomex™, and Kevlar™.

17. The seat of claim 12, wherein the rigid metal seat base side frame elements comprise trusses or webbed trusses having formed therein a plurality of recesses having stable shapes to reduce the weight of the rigid metal seat base side frame elements while maintaining strength of the rigid metal seat base side frame elements.

18. The seat of claim 12, wherein the rigid metal seat back side frame elements comprise webbed trusses having formed therein a plurality of recesses having stable shapes to reduce the weight of the rigid metal seat back side frame elements while maintaining strength of the rigid metal seat back side frame elements.

19. The seat of claim 12, wherein the seat pan assembly includes a molded composite seat cover having sides extending across the plurality of rigid metal seat base side frame elements to provide energy absorption capability in a download by deforming up and over the plurality of rigid metal seat base side frame elements and allowing a center portion of the molded composite seat cover to deflect downwards.

20. The seat of claim 19, wherein the molded composite seat cover is lightly fastened by fasteners to the plurality of rigid metal seat base side frame elements with the fasteners shearing out when exposed to a downward crash energy.

21. The seat of claim 19, wherein the molded composite seat cover is not fastened to the plurality of rigid metal seat base side frame elements.

22. An aircraft seat comprising:
a seat base assembly including at least two rigid metal seat base side frame elements joined by a seat pan assembly, wherein the seat base assembly is designed to permanently deform in a severe aircraft crash; and
a seat back assembly attached to the seat base assembly.

23. The aircraft seat of claim 22, wherein the seat pan assembly includes a molded composite seat cover having sides extending across the plurality of rigid metal seat base side frame elements to provide energy absorption capability in a download by deforming up and over the plurality of rigid metal seat base side frame elements and allowing a center portion of the molded composite seat cover to deflect downwards.

24. The aircraft seat of claim 22, wherein the seat pan assembly includes a block of honeycombed material, wherein the block of honeycombed material is capable of absorbing energy by inelastic deformation.

25. The aircraft seat of claim 24, wherein the block of honeycombed material is aluminum.

26. The aircraft seat of claim 25, wherein at least one side of the block of aluminum honeycombed material is bonded to a sidewall.

27. The aircraft seat of claim 24, wherein the honeycomb openings of the block of honeycomb material are aligned such that they form a plane approximately parallel to a seating surface.

28. The aircraft seat of claim 22, wherein the seat pan assembly includes a download energy absorber comprising a block of honeycomb comprising one or more of Nomex™ material, carbon, Kevlar™ material, and paper.

29. The aircraft seat of claim 22, wherein the seat base assembly is further designed to permanently deform to absorb a forward crash load energy associated with an aircraft crash.

30. The aircraft seat of claim 22, wherein the seat back assembly comprises a plurality of rigid metal seat back side frame elements joined by a contoured composite seat back, the plurality of rigid metal seat back side frame elements to absorb forward crash load energy by permanently deforming during an aircraft crash.

31. A seat assembly comprising:
a seat base energy absorber, wherein the seat base energy absorber includes a block of honeycombed material, wherein the block of honeycombed material is designed to inelastically deform in an aircraft crash; and
wherein a sidewall is attached to a side of the block of honeycombed material.

* * * * *